June 2, 1925.
S. BLASSIE
CUTTING DEVICE FOR BUTTER AND LIKE PRODUCTS
Filed Dec. 10, 1923
1,540,246
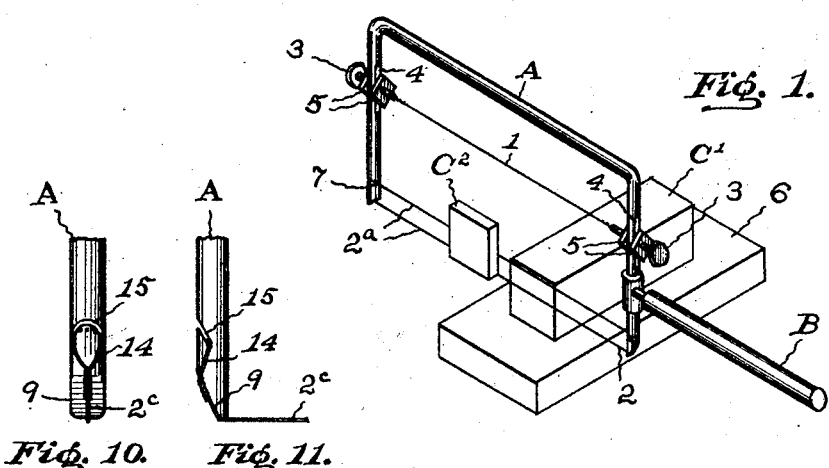
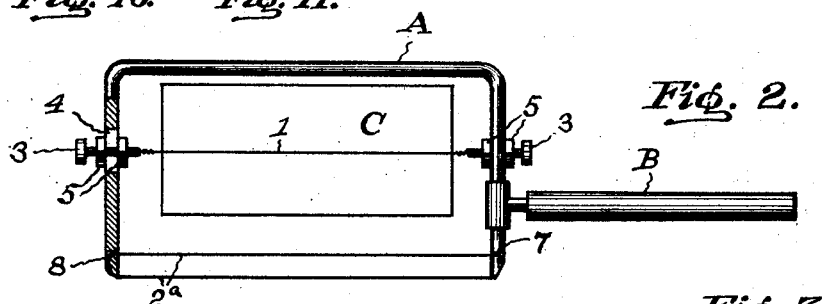
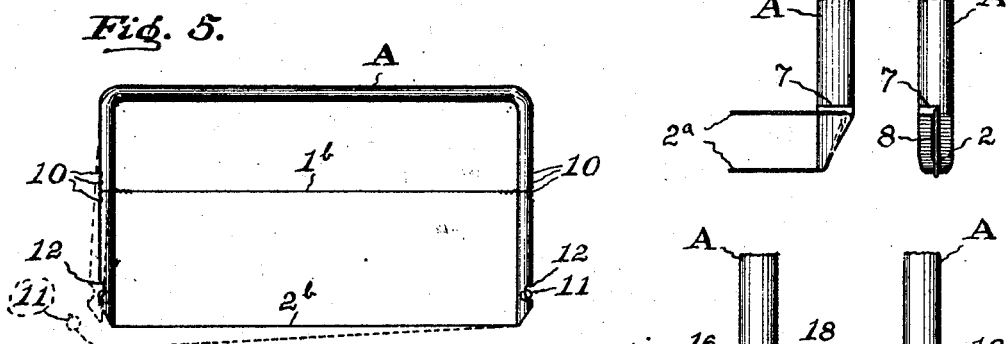
INVENTOR.
S. Blassie
BY Robt Robbitiee
ATTORNEYS Patented June 2, 1925.

1,540,246

UNITED STATES PATENT OFFICE.

STEVE BLASSIE, OF ASHTABULA HARBOR, OHIO.

CUTTING DEVICE FOR BUTTER AND LIKE PRODUCTS.

Application filed December 10, 1923. Serial No. 679,551.

*To all whom it may concern:*

Be it known that I, STEVE BLASSIE, a citizen of the United States, residing at Ashtabula Harbor, in the county of Ashtabula and State of Ohio, have invented certain new and useful Improvements in Cutting Devices for Butter and like Products, of which the following is a specification.

The present invention relates to a device for cutting butter and similar plastic products, and has for its object to provide a device of this character which embodies novel features of construction whereby a block of butter can be quickly and accurately cut into chips of a suitable size for use in restaurants and eating houses.

Further objects of the invention are to provide a device of this character which is comparatively inexpensive in its construction, which is sanitary and economical in its operation and which enables the operator to determine the size and thickness of the chips into which the butter is being cut at will.

The use of this invention will do away with the old method of cutting butter by wrapping waxed paper around the blade of a knife, and for many purposes is preferable to certain more complicated and more expensive forms of apparatus which always cut the same size of chip and which operate in such a manner that the chips often stick together and have to be separated by hand.

With the above and other objects in view the invention consists in certain combinations and arrangements of the parts as will more fully appear as the description proceeds, the novel features thereof being pointed out in the appended claims.

For a full understanding of the invention reference is to be had to the following description and accompanying drawings, in which—

Figure 1 is a perspective view of a butter cutting device which is constructed in accordance with the invention, showing the manner of using the same for cutting a subdivision of butter into small chips.

Figure 2 is a top plan view showing the manner of using the device when initially cutting a large piece of butter into subdivisions preparatory to cutting the subdivisions into chips in the manner illustrated by Fig. 1.

Figures 3 and 4 are detail views showing the manner of attaching the chip cutting wire to the frame.

Figure 5 is a side elevation of a modified form of the butter cutter with the handle removed, one of the arms of the resilient frame being shown by full lines in the position assumed when the wires are attached thereto and by dotted lines in the position assumed when the wires are detached therefrom, the arm being flexed inwardly when the wires are attached thereto so that the resiliency of the frame is utilized to hold one of the wires taut.

Figures 6 and 7 are detail views showing the manner of attaching the chip cutting wire to the frame.

Figures 8 and 9 are detail views showing a further modification in which a narrow flat blade is substituted for the chip cutting wire.

Figures 10 and 11 are detail views showing another possible manner of attaching a chip cutting wire to the frame.

Corresponding and like parts are referred to in the following description and indicated on all of the views of the drawings by like reference characters.

Referring to the drawings, the reference character A designates a U-shaped frame which is formed of resilient material and which is provided with a suitable handle B for convenience in handling and manipulating the same. The arms of the frame A are connected at points intermediate their ends by a wire 1, which has a definite relation to the back of the frame. The said arms are also connected at their free ends by a chip cutting wire 2. The wire 1 is used for the initial subdivision of a block C of butter into a number of smaller pieces C' which are adapted to be cut by the wire 2 into chips $C^2$ which are of a proper size for use in restaurants and eating houses.

The wire 1 has a spaced and parallel relation to the back of the U-shaped frame A and is preferably mounted so that it can be moved toward and away from the back of the frame, thereby enabling any slight adjustment which may be necessary to be readily made. As shown in Figures 1 and 2 of the drawings, the ends of the wire 1 are connected to bolts 3 which are slidably received within slots 4 in the arms of the U-shaped frame A. A pair of nuts 5 are threaded upon each bolt 3 and by properly manipulating the nuts the bolts can be clamped in adjusted positions within the slots and also adjusted to regulate the tension in the wire 1. It is almost the universal practice at the present time for creameries and manufacturers to furnish butter in one pound blocks which are of such a size that it is desirable to cut them initially into four of the longitudinal subdivisions $C^1$. The wire 1 is used for this purpose and the back of the frame A serves as a gauge to permit of the accurate cutting of the butter with this wire. The block of butter C is preferably placed upon a small slab 6 of wood or the like and the wire 1 applied to the top of the butter intermediate of the two longitudinal sides thereof. The frame A is then in a substantially horizontal position and it is forcibly moved downwardly while retaining a horizontal position, thereby cutting the block C of butter into halves, each of which is subsequently cut in a similar manner into the halves or subdivisions $C^1$. When cutting the butter into these subdivisions the back of the frame A, as previously stated, is utilized as a gauge or guide member. The wire 1 has a parallel relation to the back of the frame and when the wire is in proper position intermediate the upright sides of the butter the back of the frame is parallel to one side of the butter and slightly spaced therefrom. The operator can readily maintain the back of the frame in a properly spaced relation to the side of the butter as the frame is moved downwardly, and the wire 1 is thereby caused to cut accurately through the butter and be properly guided in its movements, even though the major portion of the wire itself is concealed from view. The adjustment of the bolts 3 within the slots 4 enables the wire 1 to be properly set with respect to the back of the frame, and the nuts 5 can be manipulated to tighten or loosen the wire as may be desired. It has been found in practice, however, that the best results are obtained when the wire is a trifle loose and becomes flexed or bowed upwardly as it is forced downwardly through the butter.

The wire 2 which connects the ends of the U-shaped frame A is utilized for cutting the subdivision C' of butter into the individual chips $C^2$. In the form of the invention shown by Figures 1, 2, 3 and 4 the wire 2 comprises two strands which connect the ends of the frame and assume a spaced and slightly parallel relation, being arranged substantially in the plane of the U frame. The resiliency of the U frame holds the two strands $2^a$ of the wire 2 taut, and the cutter is manipulated manually so that these wires are utilized to cut the subdivision C' of the butter into the chips $C^2$. Each chip $C^2$ as it is severed from the subdivision $C^1$ will adhere to the strands $2^a$ of the wire, so that it can be lifted away from the larger subdivision $C^1$ of the butter and flipped or thrown into a dish of water without being handled. After the frame A has been brought into proper position it is given a sudden jerk and the chip of butter is thereby caused to be disengaged from the wires and dropped into the dish of water. There is thus no necessity for touching the butter chips with the fingers, and the thickness of the butter chips can be varied at the will of the operator. It is not necessary to cut the butter into chips of a predetermined thickness, and the chips can be as thin or as thick as is desired.

In the construction shown by Figures 1 to 4 inclusive the wire 2 is looped to provide the two strands $2^a$, and the ends of the wire loop are interlocked in transverse notches 7 and longitudinal notches 8 in the ends of the frame A. These notches intersect each other, the transverse notches 7 being formed in the arms of the frame at points slightly spaced from the ends thereof and the longitudinal notches 8 lead from the transverse notches 7 toward the ends of the arms. The ends of the arms of the U-shaped frame are preferably tapered or beveled, as indicated at 9, and the outer strand of the wire is stretched taut over the said beveled ends. The resiliency of the frame holds the strands $2^a$ of the wire taut, and it has been found that these wires will cut the butter in a quick and effective manner and without any waste. By flexing one or both of the arms of the frame inwardly the looped wire 2 can be readily engaged with the notches or disengaged therefrom, as may be desired.

A slight modification is shown by Figures 5, 6 and 7, in which the wire $1^b$ which is used for cutting the block of butter into the initial subdivisions is looped around the arms of the frame A and caused to engage selected notches 10 in the arms of the frame. The position of the wire with respect to the back of the frame can be varied by causing the ends of the wire to engage the proper notches 10. This wire $1^b$ is used in the same manner as the wire 1 for cutting the block C of butter into the initial subdivisions $C^1$. The chip cutting wire $2^b$ has only a single strand which extends across the frame. The ends of the strand are provided with balls or heads 11 which are adapted to be removably seated within the pockets 12 formed in the arms of the frame. Slots 13 lead from the pockets to the beveled ends 9 of the arms of the frame. The arms of the frame can be flexed inwardly toward each other to permit of the balls 11 being placed in the pockets 12 or removed therefrom. After the wire $2^b$ has been applied to the frame it is held taut by the resilience thereof and the wire can be used in the same manner as the wire 2 for cutting the subdivisions $C^1$ of the butter into the chips $C^2$.

The chips will stick or adhere to the single wire in much the same way as they do to the double wire, so that they can be thrown into a dish of water without being touched by the fingers.

A further slight modification is illustrated by Figures 10 and 11, in which a single wire $2^c$ is utilized for cutting the subdivisions of butter into the chips $C^2$. This single wire $2^c$ is provided at the ends thereof with loops 14 which are interlocked with diagonal cuts or notches 15 in the arms of the U-shaped frame A. The resilience of the U-shaped frame A holds the wire taut when it is in use, although by forcibly flexing one or both of the arms of the U-shaped frame inwardly the looped ends 14 of the wire can be engaged with or disengaged from the cuts 15, as may be desired.

A still further slight modification is illustrated by Figures 8 and 9, in which a narrow flat blade $2^d$ is substituted for the chip cutting wire. This blade has flared ends 16 which are received within slots in the ends of the U-shaped frame. The flared ends 16 of the cutting blade have the ends thereof bent laterally in a plane at an acute angle to the cutting edge of the blade, and these laterally bent portions are received in V-shaped notches 18 in the arms of the frame. The ends of the blade thus have a detachable and interlocking engagement with the frame so that the blade is held taut when the device is in operation, although it can be readily disengaged from the frame or placed in engagement therewith by flexing one or both of the arms of the frame inwardly.

As previously stated the wire 1 for cutting the butter into the larger subdivisions is preferably loose, while the wire 2 for cutting the subdivisions into the chips is preferably taut. The U-shaped frame A is formed of resilient metal and the chip cutting wire 2 is of such a length as to hold the arms of the frame flexed inwardly when it is in position, thereby utilizing the resiliency of the frame to retain the wire taut. When the arms of the frame are thus flexed inwardly by the attachment of the chip cutting wire 2 thereto the desired looseness is brought about in the wire 1.

While certain particular embodiments of the invention have been illustrated and described in detail, it will be understood that many modifications and changes can be made in the details of construction without departing from the spirit of the invention or the scope of the claims.

Having thus described my invention, what I claim as new and desire to secure by Letters Patent of the United States is,

1. A cutter for butter and like products including a frame having spaced resilient arms, and a pair of independent cutting wires connecting the resilient arms, one of the wires being held taut and serving to flex the arms inwardly a sufficient amount to maintain looseness in the other wire.

2. A cutter for butter and like products, including a resilient frame formed with spaced arms, a wire connecting intermediate portions of the arms, and a chip cutting wire connecting the ends of the arms and flexing the arms inwardly to maintain looseness in the first mentioned wire and utilize the resiliency of the frame to hold the chip cutting wire taut.

3. A cutter for butter and the like, including a resilient U-shaped frame having intersecting notches in the arms thereof, said notches being disposed in an angular relation to each other and having open ends admitting of a wire being readily inserted in the notches or removed therefrom, and a cutting wire having looped end portions which have a quickly detachable interlocking engagement with the intersecting notches, being adapted to be readily inserted in the notches or removed therefrom through the open ends of the notches, the resilience of the frame serving to keep the wire taut and at the same time holding the looped end portions thereof in engagement with the notches.

4. A cutter for butter and the like, including a resilient U-shaped frame having intersecting transverse and longitudinal notches in the arms thereof, the transverse notches opening on a side of the frame while the longitudinal notches open on the ends of the frame and extend through the extremities of the arms, and a cutting wire having looped end portions which have a quickly detachable interlocking engagement with the intersecting notches, being readily insertable into the notches or removable therefrom through the open ends of the notches, the resiliency of the frame serving to keep the wire taut and at the same time holding the looped end portions thereof in engagement with the notches.

In testimony whereof I affix my signature.

STEVE BLASSIE.